April 11, 1939.  J. M. WOLF  2,154,370
ROTARY INTERNAL COMBUSTION MOTOR
Filed Feb. 18, 1937  4 Sheets-Sheet 1
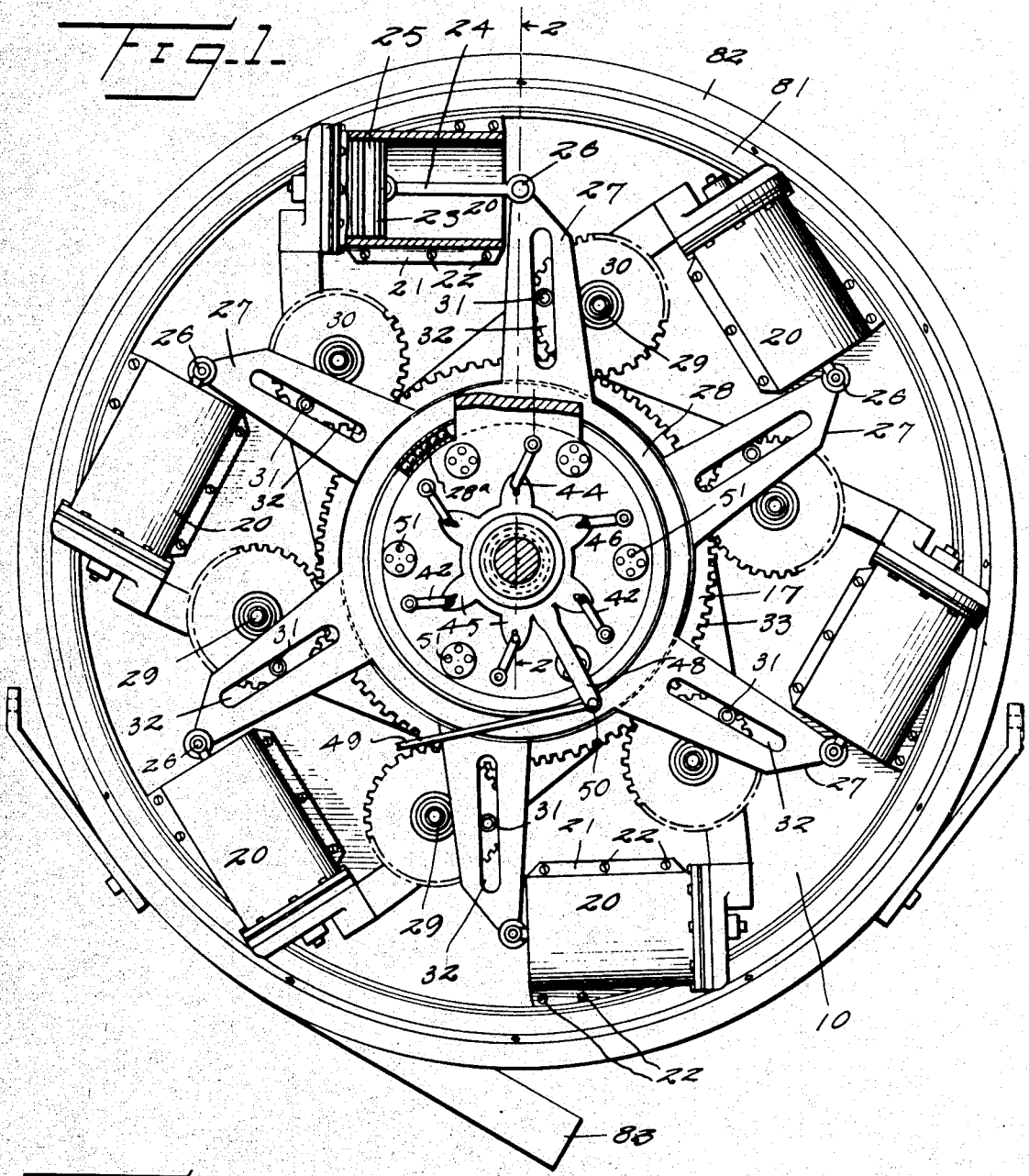
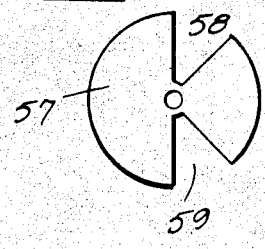
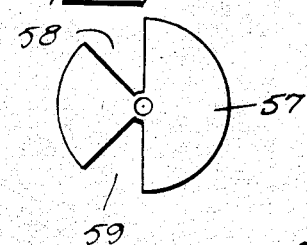
Inventor
J. M. Wolf
By L. F. Randolph
Attorney

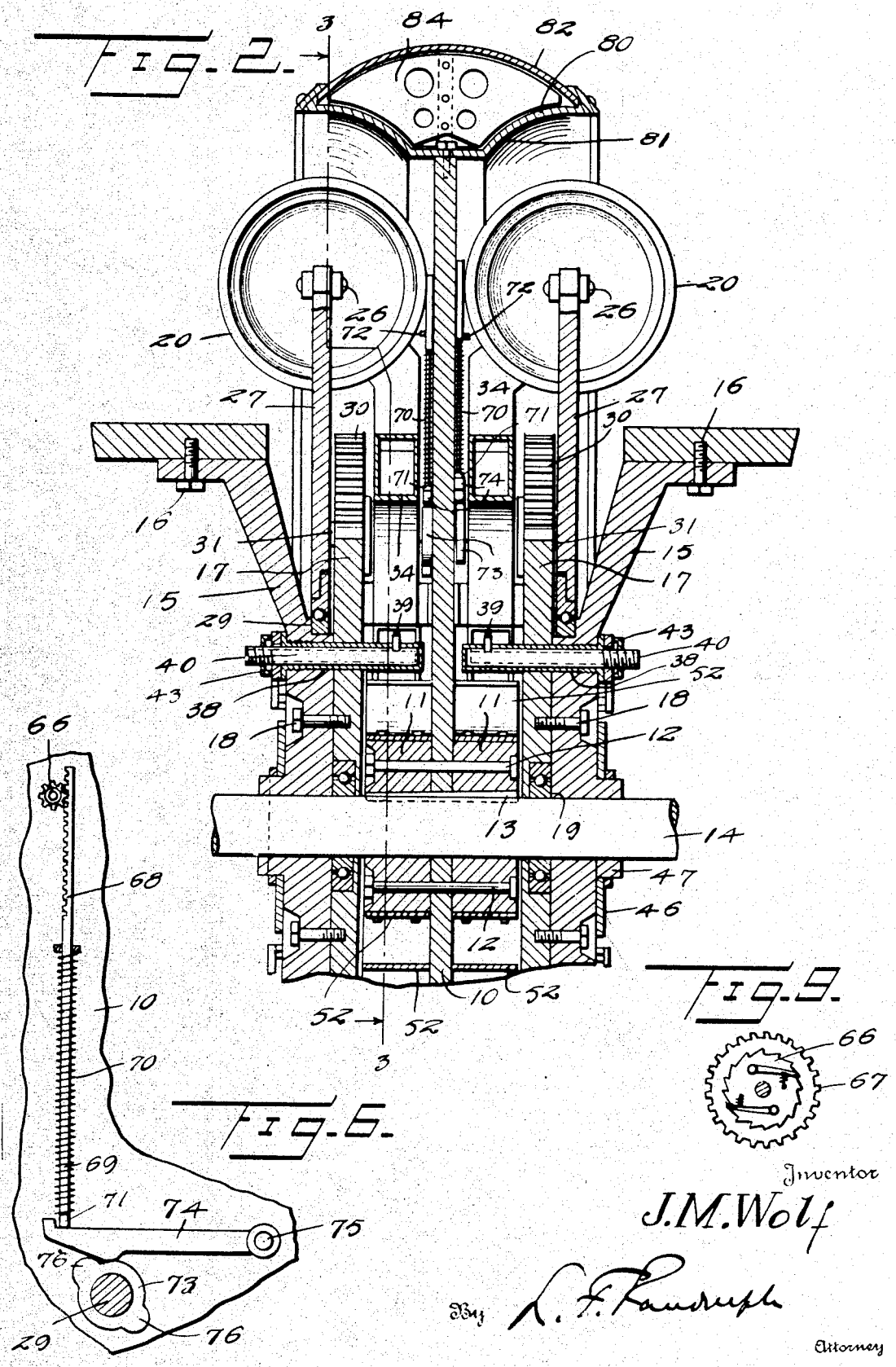

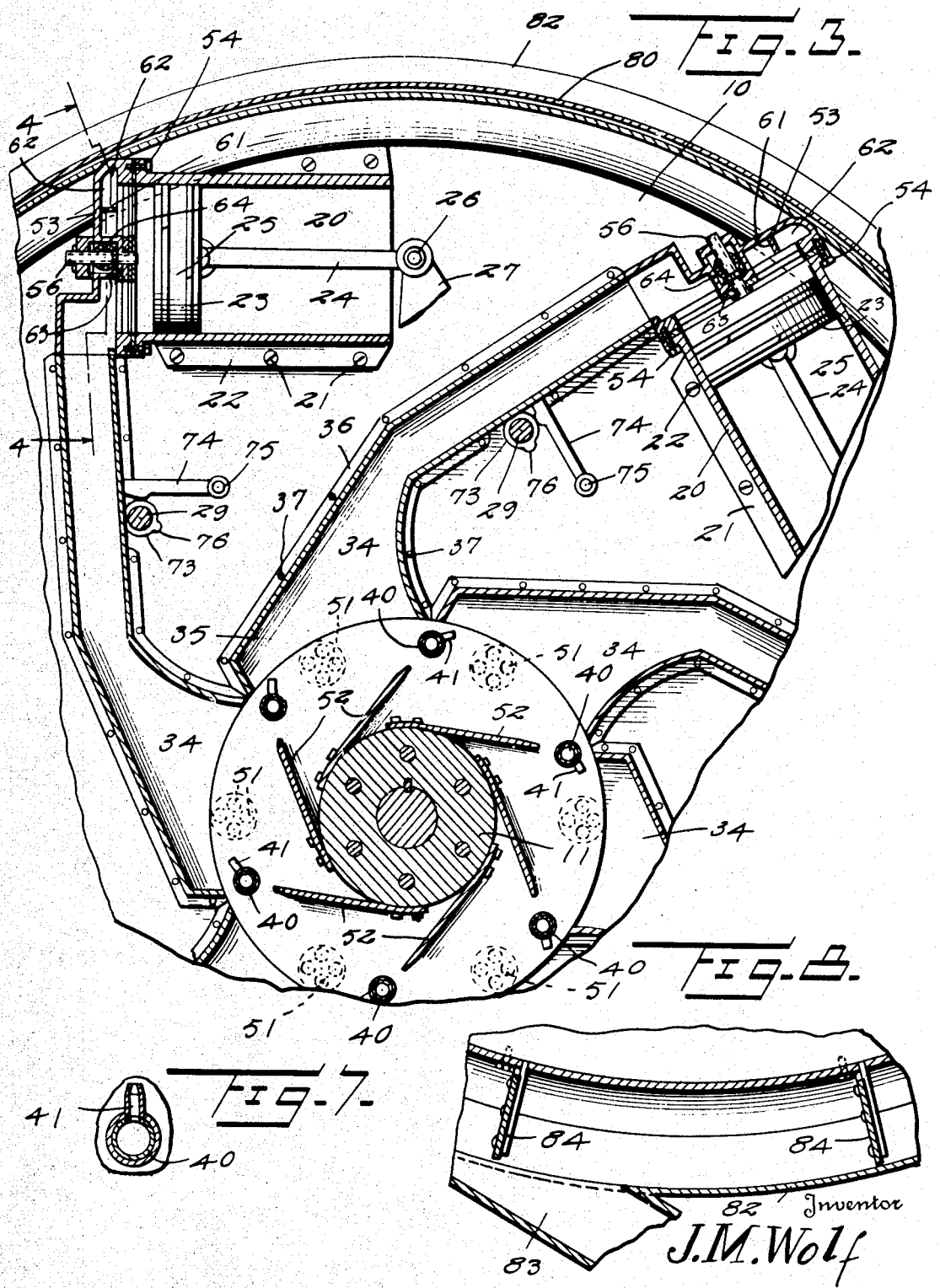

April 11, 1939.  J. M. WOLF  2,154,370

ROTARY INTERNAL COMBUSTION MOTOR

Filed Feb. 18, 1937  4 Sheets-Sheet 4

Inventor
J. M. Wolf
By L. F. Laudrum
Attorney

Patented Apr. 11, 1939

2,154,370

UNITED STATES PATENT OFFICE 2,154,370

ROTARY INTERNAL COMBUSTION MOTOR

John M. Wolf, Kansas City, Mo., assignor of one-half to Linford G. Wolf, Kansas City, Mo.

Application February 18, 1937, Serial No. 126,476

3 Claims. (Cl. 123—43)

This invention relates to a rotary internal combustion motor and it aims to provide a generally improved, simplified and durable construction which will develop more power, occupy less space, have less weight per horse-power, have less air resistance, in which the exhaust is muffled, and a construction affording ease of installing units or parts when necessary.

It is also aimed to provide a construction wherein the exhaust will be discharged without contact with the working parts so as to avoid the necessity of employing a cooling system.

It is further aimed to provide a novel construction having a central rotatable plate, with cylinders on opposite sides thereof and carried thereby, with the driving shaft disposed centrally of the plate, and the exhaust chamber disposed circumferentially of the plate.

It is further aimed to provide a novel and improved construction of value means for the intake of carbureted fuel and for the exhaust of the same from the cylinders, in combination with novel means for the intake of the carbureted fuel and air and the admixture thereof within the motor in its travel to the cylinders.

The more specific objects and advantages will become apparent from a consideration of the description following taken in connection with accompanying drawings illustrating an operative embodiment.

In said drawings:—

Figure 1 is a view of the improved motor in side elevation, partly broken away to disclose details;

Figure 2 is an enlarged vertical section taken on the plane of line 2—2 of Figure 1;

Figure 3 is a vertical sectional view taken on the plane of line 3—3 of Figure 2;

Figure 6 is a detail section taken on the line 6—6 of Figure 4;

Figure 7 is an enlarged cross sectional detail through the fuel supply valve means at the nozzle;

Figure 8 is a fragmentary vertical sectional view taken at a right angle to the axis of rotation through a portion of the motor adjacent the margin thereof;

Figure 9 is a detail side elevation of one of the drive pinion devices for the valves; and Figures 10 and 11 are detail plan views of the valves employed.

Figure 4:
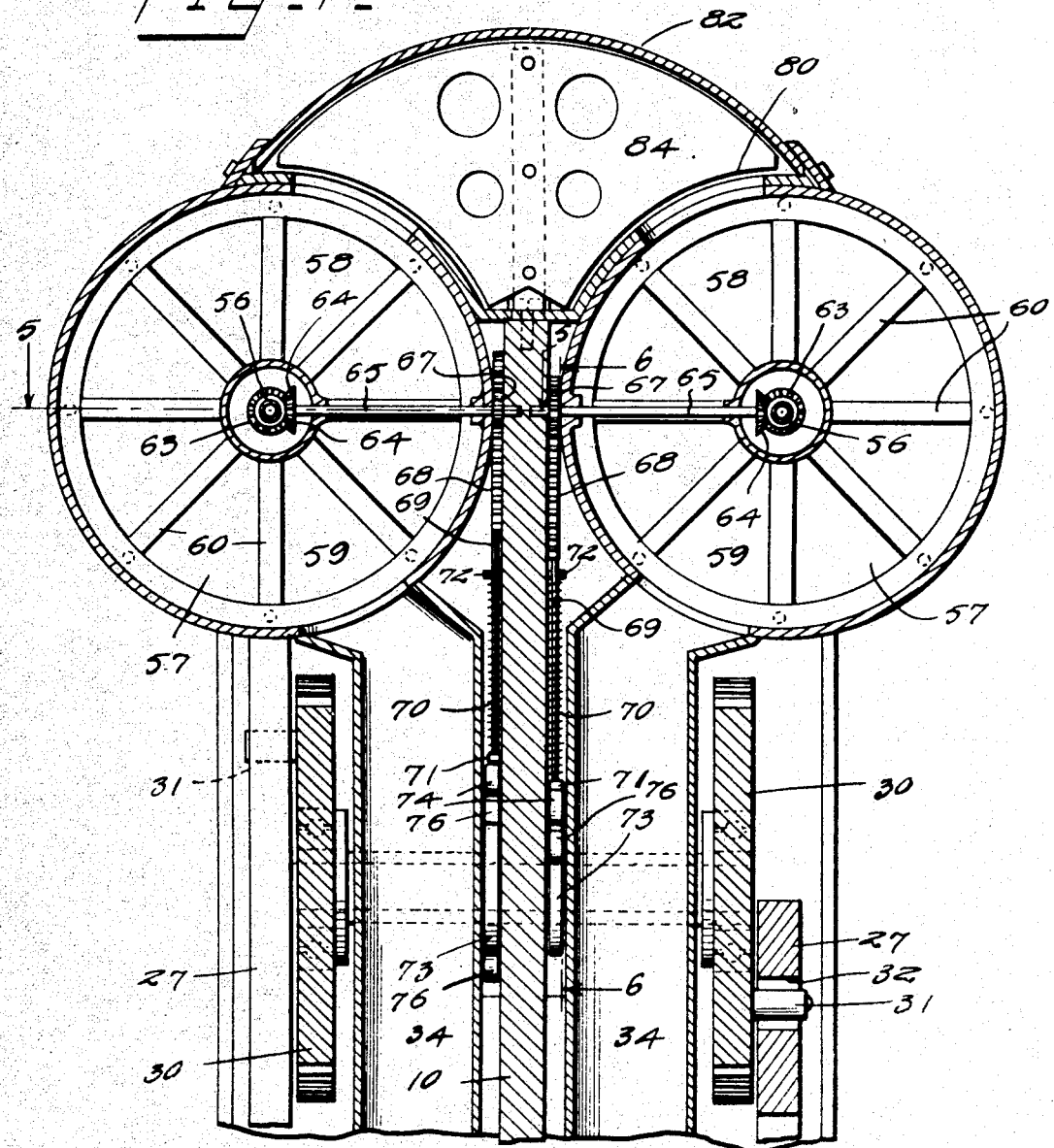
Figure 4 is a detail section taken on the plane of line 4—4 of Figure 3.
Figure 5:
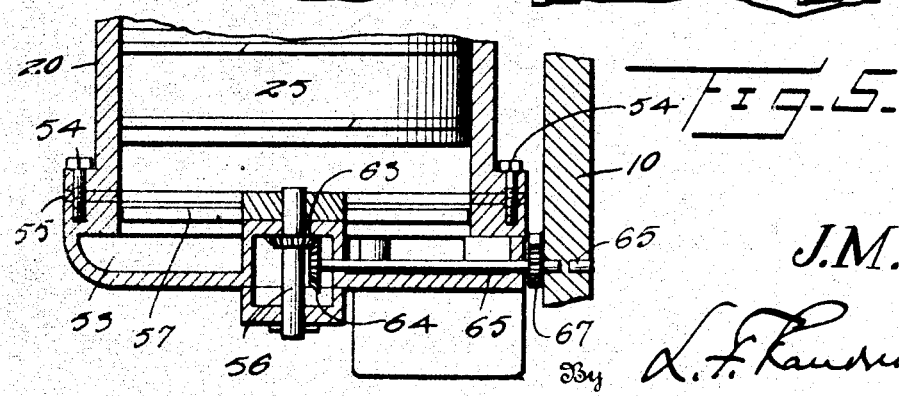
Figure 5 is a sectional view taken on the plane of line 5—5 of Figure 4.

Referring specifically to the drawings wherein like reference characters designate like or similar parts, 10 designates a central vertically disposed rotatable plate having hub sections 11 disposed against opposite sides thereof and rigidly fastened thereto by means of bolts 12, said plate 10 and hub sections 11 being keyed as at 13 to the main shaft 14 of the motor. Which is journaled in suitable supporting means 15, stationarily mounted as at 16, and disposed on opposite sides of the motor. Gear members affording annular racks at 17 are fastened against the inner surfaces of each of the fixed supports 15 as by means of screws 18 and ball bearing devices 19 for the shaft 14 are preferably housed within the stationary gear members 17.

Fastened to the plate 10 equidistantly on opposite sides thereof are cylinders 20, the cylinders on one side, being laterally in line with those of the other side. Said cylinders have flanges 21 through which screws 22 may be passed to secure them to the plate. Pistons 23 are reciprocable within the cylinders, having connecting rods 24 pivoted thereto as at 25 and pivoted as at 26 to cranks or arms 27 extending from a ring 28, which is journaled, aided by suitable ball bearing devices 28ª, on the supports 15 at annular portions thereof concentric with the shaft 14. The pistons 23, through internal combustion within the cylinders 20 are adapted to drive or rotate the ring 28.

A series of transverse shafts 29 are journaled in suitable bearings on the plate 10 and on opposite sides of the plate have similar gears 30 keyed thereto and each gear has an eccentric pin 31 thereon disposed in an elongated slot 32 in the adjacent crank or arm 27 of the ring 28. As the ring 28 is rotated as a result of the explosions within the cylinders, the cranks 27 at the slots 32 so act on the pins 31 as to rotate the gears 30 and cause them to travel circumferentially or orbitally on the fixed gears 17, with the teeth 33 of which they are enmeshed.

Carried by the plate 10 on opposite sides thereof and extending from the central portions thereof to the cylinders 20 are ducts 34, the same preferably being enlarged or flared at their inner ends as at 35, and connected to each other, the ducts preferably having flanges 36 through which bolts or rivets 37 are passed to secure the same to the plate.

Fastened in the supports 15 and extending through the fixed gears 17 are fuel inlet pipes 38, one for each duct 34 and which pipes have outlet nipples 39 providing ports in communication with the inner or larger ends of the ducts 34. Tubular valves 40 are journaled in the pipes or tubes 38 and they have discharge ports or openings 41 therein adapted at suitable intervals to register with the nipples 39 but at other times maintain the nipples 39 closed. The pipes 40 are arranged in any suitable manner in communication with any suitable source of fuel supply and for instance gasoline. In order to operate the valves 40 at the proper times, such valves have cranks 42 rigidly but detachably connected therewith as at 43. Said cranks 42 have projections 44 engaged in elongated radial slots 45 of controllers 46 journaled on enlargements 47 of the supports 15 and which controllers have arms 48 to which a rod or the like 49 is pivoted at 50, the rod being adapted to be shifted by any suitable means, for instance cam mechanism on the main shaft 14 in order to permit the delivery of the gasoline or fuel under pressure at the desired times, through the valves 40, their ports 41 and nozzles 39 into the ducts 34. It will be noted that openings or orifices 51 may be provided through the supports 15 and fixed gears 17, so that air may be taken into the ducts 34 from the atmosphere, to be admixed with the fuel and fed forwardly through the fan action of blades 52 fastened tangentially on the hub sections 11.

Said cylinders 20 each has a hollow head 53 detachably bolted or otherwise fastened thereto as at 54, with a gasket 55 interposed. Said heads are connected in communication with the ducts 34. Said heads centrally have shafts 56 journaled therein to which valves 57 are keyed, having ports 58 and 59 therein, serving respectively, for the intake of fuel and for the exhaust of spent gases from the cylinders. Such valves 57 are located within the heads and they bear against and are reenforced by spaced skeleton ribs or spiders 60. It will be realized that fuel is admitted to the cylinders when the ports 58 are aligned with the cylinders and the ducts 34 but that at other times, the solid portions of the valves close such communication. Said heads 53 have partitions 61, providing exhaust passages 62 arranged out of communication with the ducts 34. The exhaust gases from the cylinders 20 pass through the ports 59 into the passages 62, when in registry therewith, it being realized that at all other times, the passage 62 is closed against communication with the cylinder by the imperforate portion of the valve 57.

In order to operate the shafts 56, they have beveled gears 63 keyed thereto with which beveled gears 64 are enmeshed, being carried by cross shafts 65 journaled in the heads 53 and on which shafts 65 a slip pawl and ratchet gear device 66 is carried, the same having teeth 67, enmeshed with vertical rack bars 68 having depending rods 69 surrounded by expansive springs 70, engaging heads 71 on the rods and abutments 72 on the plate 10, whereby the rack members 68 are urged to their innermost positions where the enlargements 71 engage cams 73 keyed on the shafts 29, through the intermediary of a pivoted arm 74, pivoted at 75 on the plate 10, the member 74 directly engaging the cam 73 so as to be actuated by the equidistantly spaced lobes 76 thereof. As a result of the devices 67, the shafts 65 will be driven in one direction only by the rack bars 68 and as the rack bars return to their normal positions under the action of the springs 70, the devices 67 will simply rotate or slip relatively to the shafts 65 without rotating them.

The exhaust passages 62 discharge into an annular exhaust space or manifold 80 provided by a rim 81 fastened to the periphery of the plate 10 which moves relatively to a fixed cover plate 82 in marginal leak proof relation therewith. A discharge pipe 83 extends from the cover 82 and the discharge of the exhaust from the manifold 80 is facilitated by the provision of blades or the like 84 fastened to the rim 81 radially thereof and traveling within the exhaust manifold.

Any suitable system of lubrication and any suitable system for firing the explosive mixtures within the cylinders may be employed. It will be realized that the operation of the parts will serve to charge, compress, fire and exhaust the explosive charge. The fuel is admitted into the manifolds 34, in proper sequence, due to the rotation of the valves 40 and registration of their ports 41 with the nozzles 39. At the same time, air enters through the ports 51. As the motor is operating, the blades 52 serve to fan the fuel and air outwardly through the ducts 34, thoroughly admixing it, and at the proper time dependent on the operation of the valves 57, such fuel enters the cylinders, being drawn in by recession of the pistons 25, following which the valves 57 close the cylinders and the charge is compressed, whereupon it is fired, driving the pistons 25 and following which the exhaust escapes, under control of the valves 57 into passages 62 and thence into the manifold 80, escaping through the pipe 83 assisted by the vanes or blades 84. As a result, the plate 10 and parts carried thereby is rotated, correspondingly rotating the main shaft 14, the motion of the pistons 25 being imparted by their connecting rods 24 to the cranks and by the latter through the medium of the elongated slots 32 and pins 31, to the gears 30 which drives the ring 28.

In the embodiment of the invention as herein described and shown in the drawings there are twelve cylinders 20 arranged six on each side of the plate 10, and three alternate cylinders are fired simultaneously at each rotation of the plate and shaft 14 through a movement of ninety degrees, the operation of the engine being of the nature of a four cycle motor, the explosions alternating in groups of three on opposite sides of the plate until the cycle is completed and then repeated.

Various changes may be resorted to provided they fall within the spirit and scope of the invention.

I claim as my invention:

1. In a rotary cylinder engine, a rotatable plate, non-radial cylinders carried on said plate, pistons operable in said cylinders, a common drive ring, an arm for each piston extending from the drive ring and connected to the respective pistons, said arms having elongated slots, a stationary annular rack, and pinions enmeshed with said rack having pins disposed in said slots.

2. In a rotary cylinder engine, a rotatable plate, two banks of non-radial cylinders one bank carried on each side of said plate, pistons operable in said cylinders, a common drive ring for each bank, an arm for each piston extending from the ring and connected to the respective piston, said arms having elongated slots, a stationary annular rack means, and pinions enmeshed with said rack means having pins disposed in said slots.

3. In a rotary cylinder engine, a rotatable plate, pairs of non-radial cylinders carried on opposite sides of said plate, each cylinder of said pairs being connected to opposite extremities of the crank shaft, said crank shaft being journaled in said plate, pistons operable in said cylinders, a common drive ring for the pistons on the opposite side of the plate, and an arm for each piston extending from the ring and connected to the respective ring, said arms having elongated slots, stationary annular rack means, and pinions enmeshed with said rack means having pins disposed in said slots.

JOHN M. WOLF.